S. D. FIELD.
Equalizing Dynamo Electric Currents by means of Secondary Batteries.
No. 236,569. Patented Jan. 11, 1881.
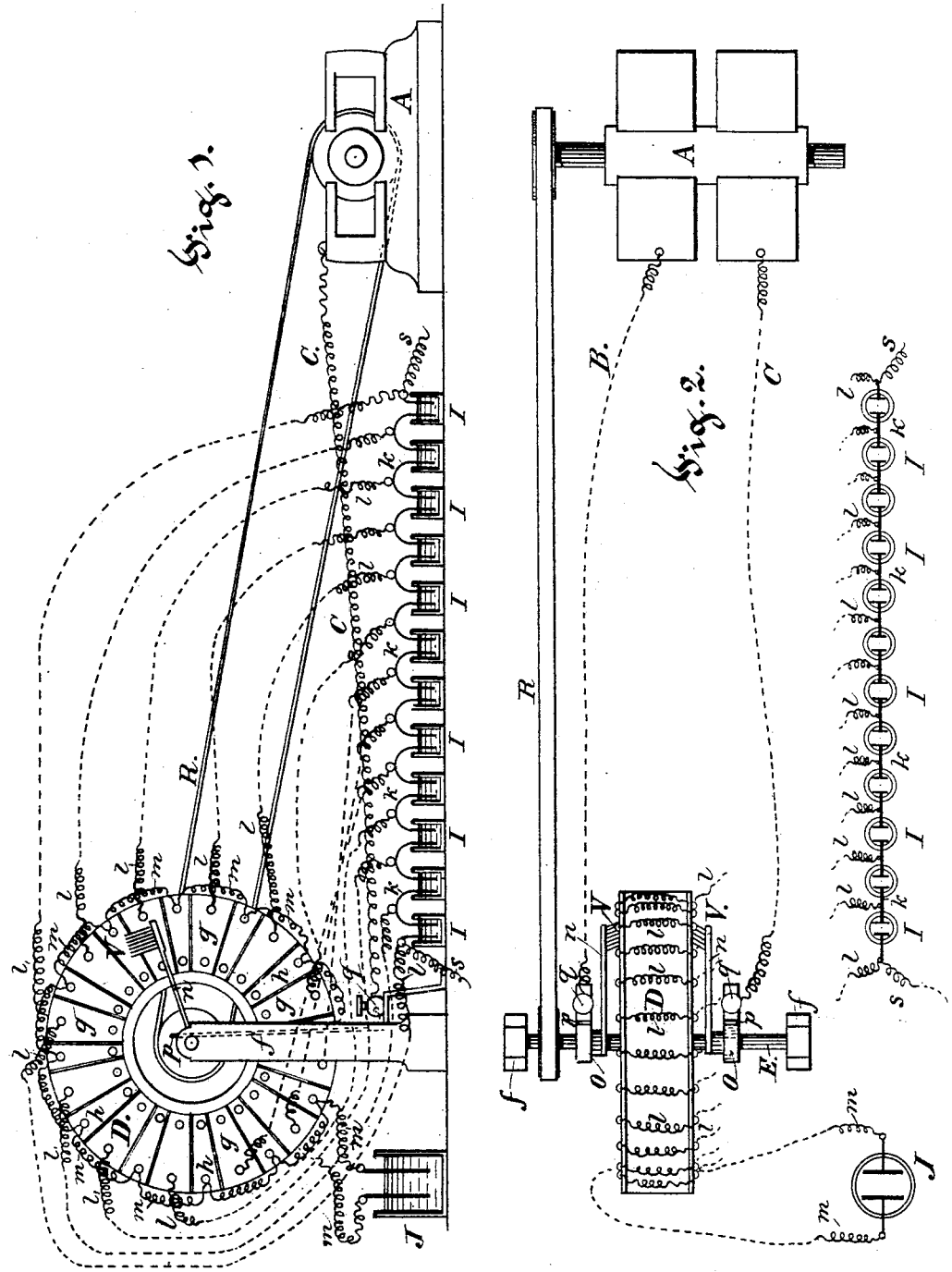
Witnesses:
W. Floyd Duckett
D. B. Lawler
Inventor:
Stephen D. Field,
per Jno. L. Boone
Attorney.

UNITED STATES PATENT OFFICE.

STEPHEN D. FIELD, OF SAN FRANCISCO, CALIFORNIA.

EQUALIZING DYNAMO-ELECTRIC CURRENTS BY MEANS OF SECONDARY BATTERIES.

SPECIFICATION forming part of Letters Patent No. 236,569, dated January 11, 1881.

Application filed August 4, 1879.

*To all whom it may concern:*

Be it known that I, STEPHEN D. FIELD, of the city and county of San Francisco, in the State of California, have invented certain Improvements in Equalizing Dynamo - Electric Currents; and I do hereby declare that the following is a full, clear, and exact description thereof, reference being had to the accompanying drawings.

The object of my invention is to tranquilize and render dynamo-electric currents constant and continuous, so that they can be used for ordinary telegraphing and other purposes for which a steady and uniform current is necessary.

It is a well-known fact that induced currents, such as are generated by dynamo-electric machines, are in a constant state of vibration, owing to the alternate polarization and depolarization of the magnets, and also that the steadiness of the current is affected by an increase or decrease in the speed of the motive power that drives the machine; and for these reasons electric currents generated in this manner could not heretofore be used for telegraphic purposes.

My invention consists in interposing a secondary battery between the dynamo-electric machine and the main - circuit wires, and in passing the dynamic current through the battery before it is taken up by the circuit wires, by which means the current is equalized and rendered steady and constant.

In the accompanying drawings I have represented a very simple and effective arrangement for this purpose; but my invention is not confined to any special manner of combining the battery with the dynamo-electric machine, as various arrangements could be used.

In the drawings, Figure 1 is a side elevation, and Fig. 2 a plan view, of an apparatus illustrating my improved system of equalizing dynamo-electric currents.

A is the dynamo-electric machine. B and C are the wires which lead the induced current away from the machine.

D is a stationary drum or solid wheel, which I prefer to make of wood or other non-conducting substance or material. This drum or wheel is secured to some stationary object in a vertical plane, and is located at some point convenient to the machine A. The wheel or drum has a hole through its center, through which a shaft, E, passes, the ends of the shaft being supported in the upper ends of standards $ff$, so that the shaft passes through the center or axis of the drum or wheel. On each side of this stationary drum or wheel I secure alternate narrow and wide metallic plates close together, but not so as to touch each other. The wide plates $g$ on one side are secured opposite the wide plates $g$ on the opposite side, while the narrow plates $h$ are also opposite each other on opposite sides. This wheel or drum, thus faced, forms the commutator for the machine A. Near this commutator I place as many cups I I I of a secondary battery as there are wide plates $g$ on one side of the commutator, and at some other point convenient I place a larger cup, J. Each two cups, I I, of the battery I connect together by a separate wire, $k$, as shown. I then connect each two opposite wide plates $g$ on the commutator D together by means of an insulated wire, $l$, and the same wire which connects these two plates I lead to the battery, and connect its opposite end with one of the wires $k$, which connects two of the cups of the battery. The wires $l$ are so disposed that the successive pairs of wide plates $g$ entirely around the commutator are connected successively with the connections of the battery. I then connect all the narrow plates $h$ on each side of the commutator by means of a single wire, $m$, and these two wires I lead to and connect with the large cup J.

Upon each side of the stationary commutator D, I secure an arm, $n$, to the central shaft, E, and to the outer end of these arms I clamp the brushes V, so that when the shaft is rotated the brush on each side will pass successively from one plate to the other. The arm on one side of the commutator is set behind the arm on the opposite side, so that the brush on one side will move two plates in advance of the brush on the opposite side. The two brushes will then move simultaneously over the wide plates and simultaneously over the narrow plates; but one brush will move over the wide plate on one side while the brush on the opposite side is moving over the next wide plate behind it, thus keeping the positive and negative currents distinct. Each arm $n$ has a wide hub, O, and a flat spring, p, is secured to the floor or foundation on which the commutator stands, and extends up so that its upper end bears upon this hub. One of the wires B C, which take the current away from the dynamo-electric machine A, is connected with the lower end of the spring p on one side of the machine by means of a screw-cap, q, while the other is connected in the same way with the spring on the opposite side.

The shaft E is driven by a belt, R, from the dynamo-machine A, so that they both operate in unison as one machine.

Now, when the dynamo-machine is set in motion, the wires B C conduct the vibratory currents to the springs p, from which they are taken by the brushes which successively transmit them to the plates on the sides of the commutator. For the purpose of illustration we will consider the machine to start with the brush on one side of the commutator in contact with the wide plate which is connected with the first cup of the battery. The brush on the opposite side will then be in contact with the first wide plate in advance of the first-named plate, and this last-named plate is connected with the wire k, that connects the first and second cups of the series. The two currents will then be received in the first cup of the battery, and the lead plate of which it is composed will receive charges of + and − electricity. The next contact of the brushes is with two narrow plates on opposite sides, and as all the narrow plates on each side are connected together and with the large cup J, the plates of this cup also receive a charge from the dynamo-machine. The brushes then pass to the next two wide plates, and carry the current to the second cup of the battery, with which these plates are connected. These electrodes, in turn, receive a charge both from the dynamo-machine and from the larger cup J at the instant of passing from the narrow to the broad strips, then to the narrow plates again, by which the current is thrown back upon the large cup J, then to a wide plate, and so on alternately, as long as the machine is in operation. The currents are thus carried successively from one pair of cups to another in rotation around the series, and are conducted from the battery by means of the wires s s, at the two ends of the battery. The large cup J serves to take the currents while change is being made from one pair of cups to the other. By this means I equalize the dynamic current, so that it flows in a steady, continuous, and uniform current from the wires s s of the battery, and the current thus corrected can be used for the most delicate telegraphic purposes.

Having thus described my invention, what I claim, and desire to secure by Letters Patent, is—

1. The improvement in utilizing dynamo-electric currents for telegraphic purposes, consisting of the commutator provided with alternate wide and narrow plates, the former being connected together in pairs and to a series of battery-cups, and the latter plates, upon each side of the commutator, being connected each to the other and to separate battery-cups, in combination with a dynamo-electric machine, its conducting-wires, and the circuit-wires, substantially as and for the purpose set forth.

2. The combination of the commutator D, provided with alternate wide and narrow plates g h, the plates g being connected together in pairs and to battery-cups, and the plates h, upon each side of the commutator, being connected each to the other and to separate battery-cups, with the dynamo-electric machine A, wires B C, springs p, arms n, having hubs O, and brushes V, substantially as and for the purposes set forth.

3. A stationary commutator, D, provided with the alternate wide and narrow plates on each side, all the narrow plates on each side being united by a single wire and connected with a cup, J, while the wide plates in pairs are connected successively with the cups I I of a battery, in combination with the dynamo-electric generator A, wires B C, springs p, arms n, with their hubs O, and the brushes V, all combined and arranged to operate substantially as and for the purpose described.

In witness whereof I have hereunto set my hand and seal.

STEPHEN D. FIELD. [L. S.]

Witnesses:
 W. F. CLARK,
 W. FLOYD DUCKETT.